Sept. 12, 1967    J. A. MILLER ET AL    3,340,847
CONTROL SYSTEMS FOR MACHINES FOR GLUE-SEALING
PRODUCT-CONTAINING CASES
Filed March 24, 1966    6 Sheets-Sheet 1
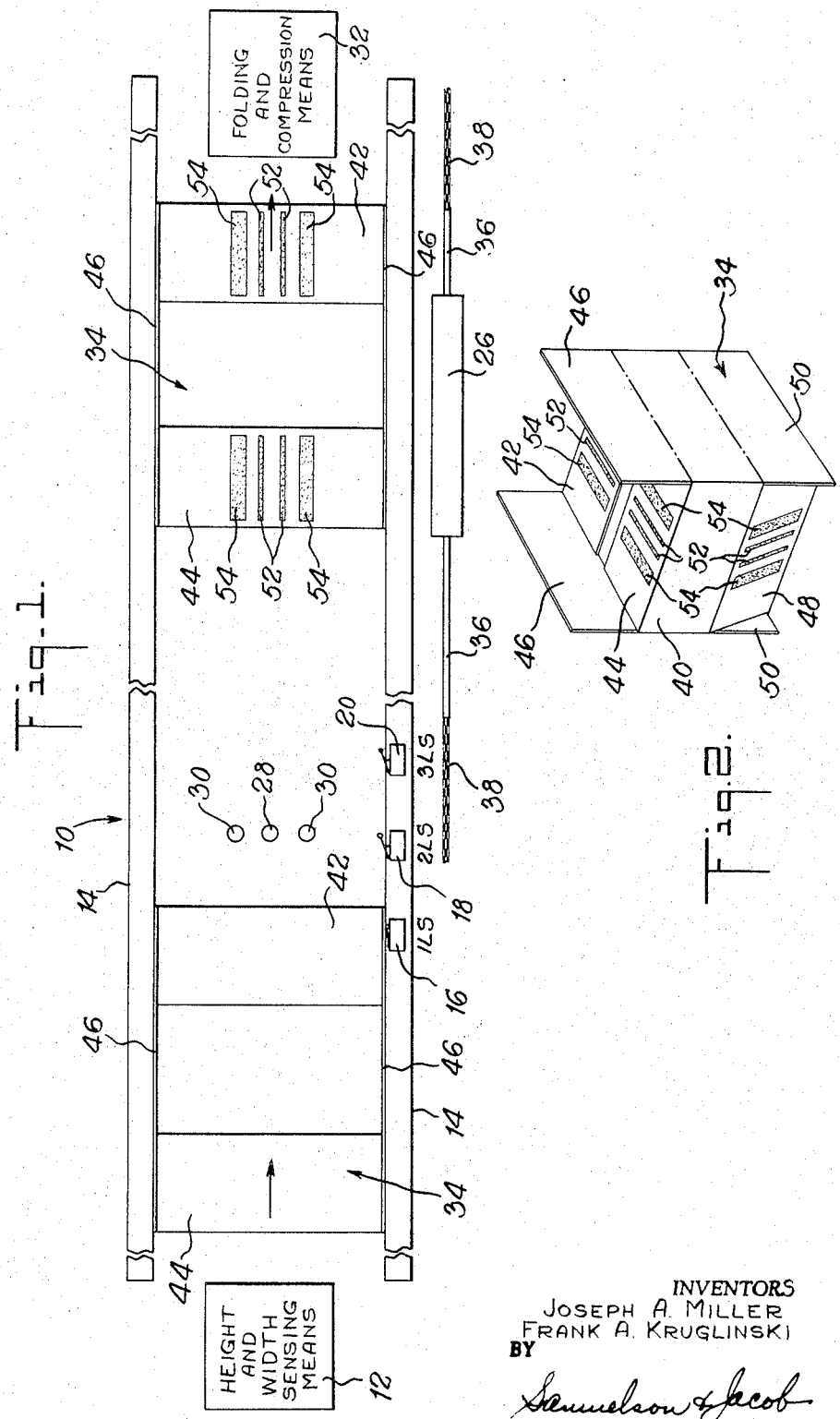
INVENTORS
JOSEPH A. MILLER
FRANK A. KRUGLINSKI
BY
Sommelson & Jacob
ATTORNEYS

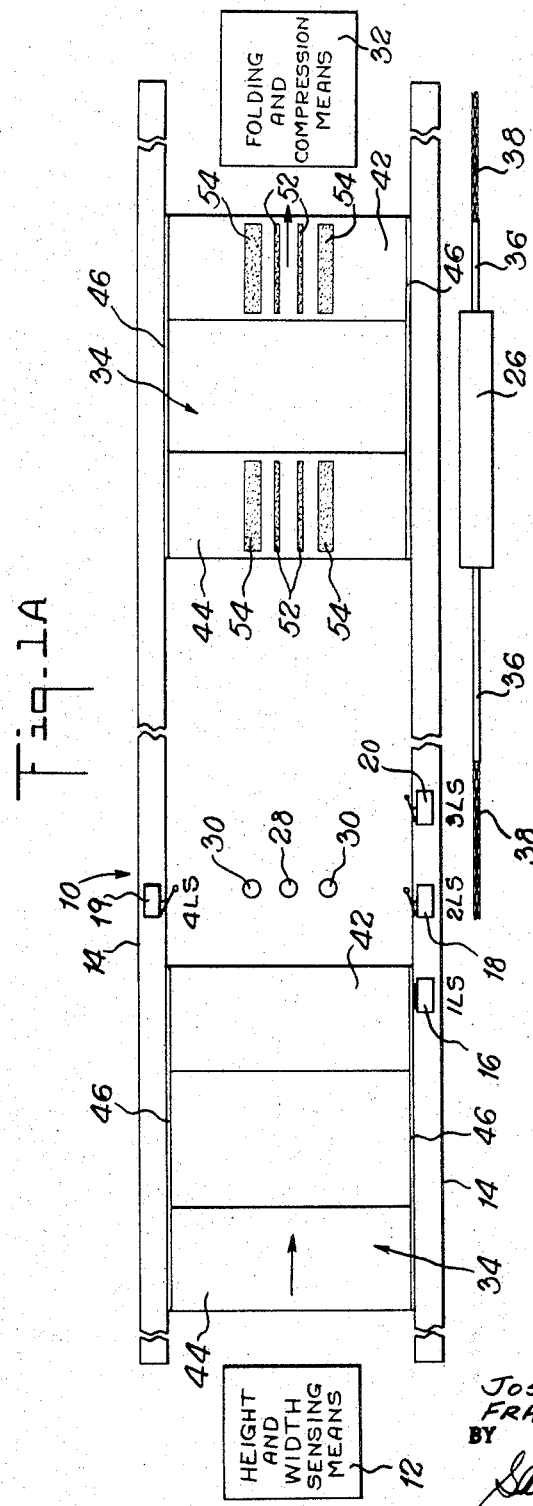

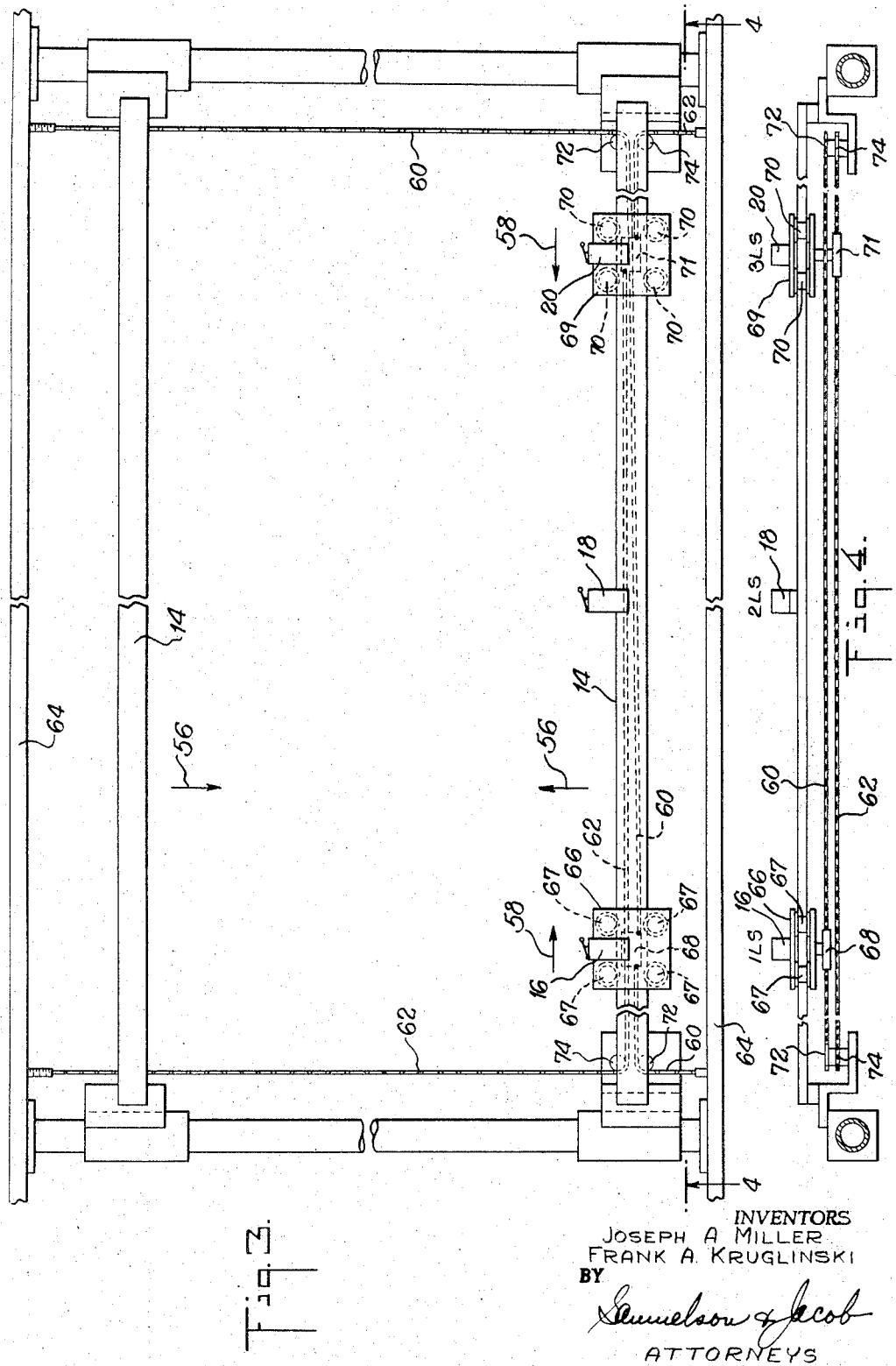

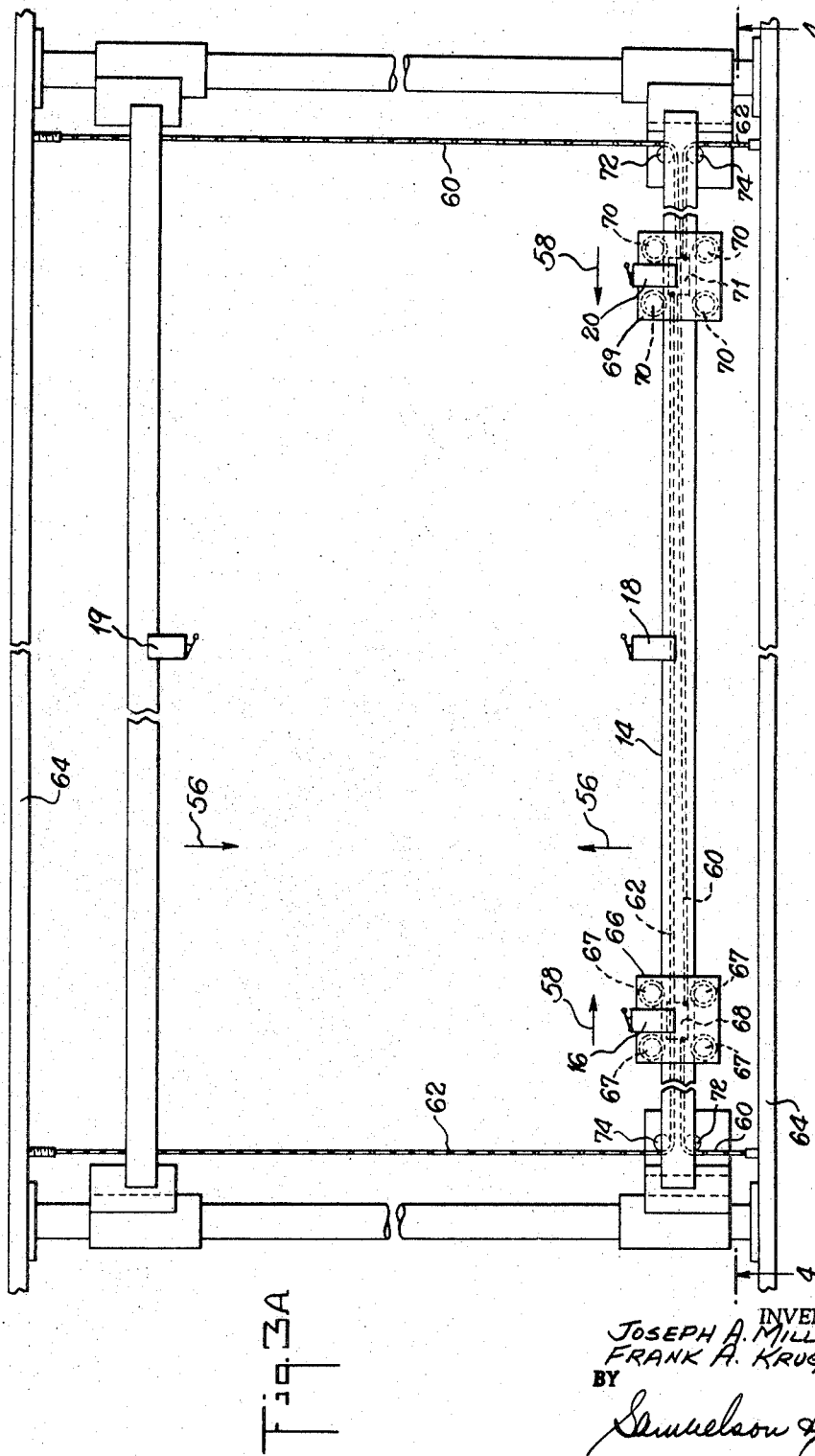

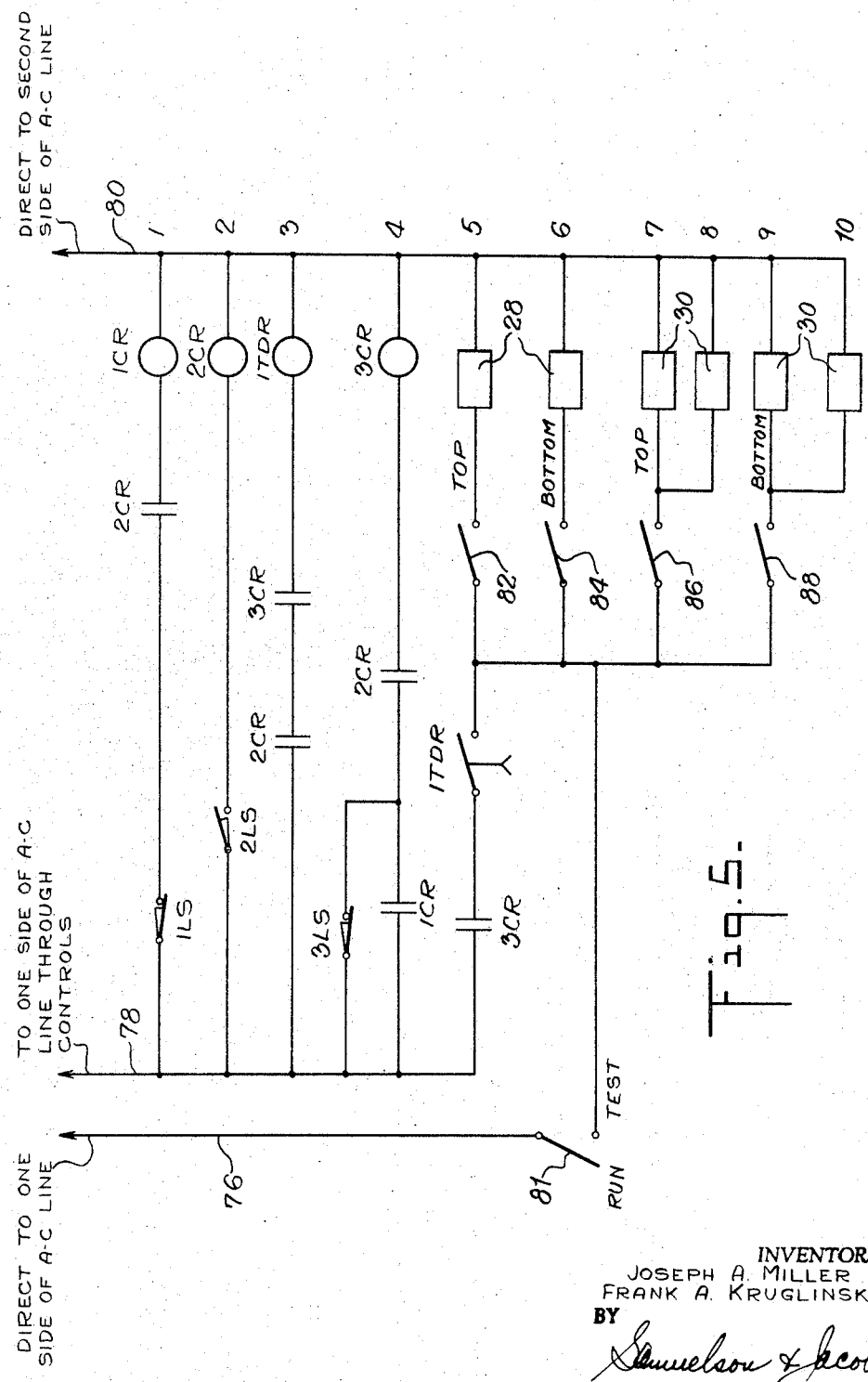

United States Patent Office 3,340,847
Patented Sept. 12, 1967

3,340,847
CONTROL SYSTEMS FOR MACHINES FOR GLUE-SEALING PRODUCT-CONTAINING CASES
Joseph A. Miller, Englewood, and Frank A. Kruglinski, North Bergen, N.J., assignors to General Corrugated Machinery Co., Inc., Palisades Park, N.J., a corporation of New Jersey
Filed Mar. 24, 1966, Ser. No. 537,241
10 Claims. (Cl. 118—2)

This is a continuation-in-part of our copending application for Letters Patent of the United States, Ser. No. 449,227, filed Apr. 19, 1965, now abandoned.

The invention relates to control systems for machines for glue-sealing product-containing cases and in particular relates to such systems which are used to control the application of thermoplastic resin adhesive and wet glue to the flaps of the case.

In our copending application, Ser. No. 150,236, filed Nov. 6, 1961, now abandoned, we have described a method of and apparatus for applying thermoplastic resin adhesive and wet glue to the inner flaps of a case. The thermoplastic resin adhesive serves to hold the flaps sealed closed until the wet glue dries and sets. The present invention utilizes the same sealing principle for glue sealing both the top and bottom of the case. Switches, which are mounted along the side rails of the machine and which are contacted by the cases moving longitudinally through the machine, are used to control the application of the thermoplastic resin adhesive and the wet glue to the top and bottom of the case.

The product is placed in the case with a support sheet at the bottom if the product is small and without such a sheet if the product is large enough to remain in the case even though the bottom flaps are open during the adhesive applying step. The system of the instant invention is used with sealing machines in which the side rails are moved automatically to accommodate cases of various sizes.

The height of the side flaps of the cases before they are folded down is equal to one-half the width of the case. The length of the leading and trailing flaps is the same as the height of the side flaps and is, therefore, also equal to one-half the width of the case. This relationship is common in cases which are to be glue-sealed because it simplifies the slotting and folding of the blank used to form the case.

Thus, it can be seen that the wider the case is, the longer the leading and trailing flaps will be. In order to obtain a good bond between the flaps, it is advisable to apply the longest possible strips of both thermoplastic resin adhesive and wet glue to the leading and trailing flaps. Therefore, it is advisable to move the switches along the side rails so that the spacings among them increase as the spacing between the side rails increases and so that the spacings among them decreases as the spacing between the side rails decreases.

Accordingly, it is an important object of the invention to provide a control system for a machine for glue-sealing cases which controls the lengths of thermoplastic resin adhesive and wet glue being applied to the leading and trailing flaps of a case as a function of the width of the case.

It is a further object of the invention to provide such a control system for such a machine which can be used to glue-seal the top of the case, the bottom of the case or both the top and bottom of the case.

It is a still further object of the invention to provide such a system wherein the longitudinal movement of the switches along the side rail is coupled with the transverse movement of the side rails and the transverse movement of the side rails is controlled by the size of the case entering the machine.

These and other objects, features, advantages and uses will be apparent during the course of this description when taken together with the accompanying drawings wherein:

FIGURE 1 is a diagrammatic plan view of a glue-sealing machine incorporating one embodiment of the control system of the invention showing the location of the switches;

FIGURE 1A is a view similar to that of FIGURE 1 of an alternative embodiment of the control system of the invention;

FIGURE 2 is a perspective view of a case showing the relative positions of the applied thermoplastic resin adhesive and wet glue;

FIGURE 3 is a plan view of a glue-sealing machine incorporating the first embodiment of the control system of the invention, with the central area expanded, showing the means for positioning the switches in accordance with the width of the case being glued;

FIGURE 3A is a view similar to that of FIGURE 3 of the alternative embodiment of the control system of the invention;

FIGURE 4 is a sectional view, taken along the lines 4—4 of FIGURES 3 and 3A, viewed in the direction of the arrows;

FIGURE 5 is a schematic diagram of the electrical circuit used in the first embodiment of the control system of the invention.

Figure 5A:
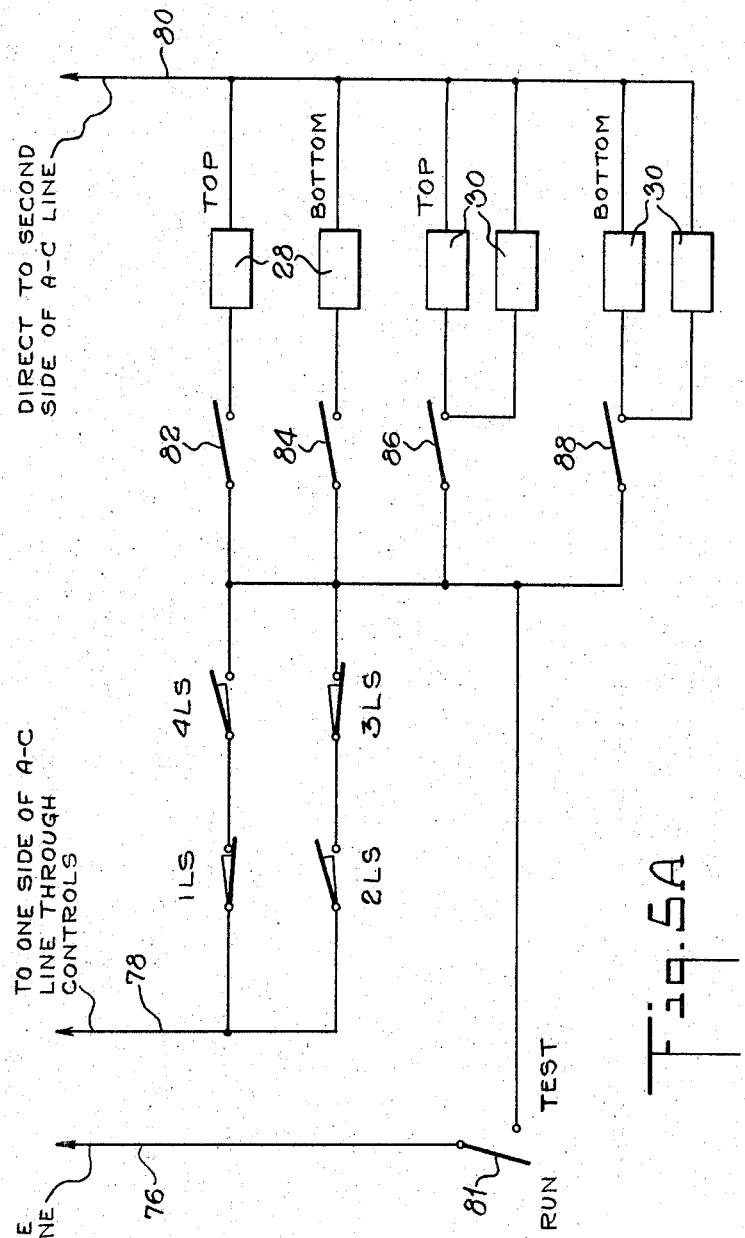
FIGURE 5A is a schematic diagram of the electrical circuit used in the alternative embodiment of the control system of the invention.

In the drawings, wherein, for the purpose of illustration, are shown preferred embodiments of the invention, the numeral 10 represents the glue-sealing machine, generally. Machine 10 is seen to comprise height and sensing means 12, side rails 14, switches 16, 18, and 20, control cylinder 26, adhesive applicators 28 and 30, and folding and compression means 32. Adhesive applicator 28 is used to extrude the thermoplastic resin adhesive and is provided with a dual orifice head so that the adhesive is applied on both sides of the longitudinal centerline of the case.

Adhesive applicators 30 are used to spray wet glue on the leading and trailing flaps of the case. The locations of the adhesives applied on the case are selected so that the wet glue does not come in contact with the thermoplastic resin adhesive. The thermoplastic resin adhesive is of the type commonly known as "hot melt" and is sold, for example, under the name Swift Hot Melt 625 by Swift and Company of Chicago, Ill. The wet glue may be a material commonly known as dextrine paste.

When the case 34 is fed to machine 10, it encounters height and width sensing means such as has been described in U.S. Patent 3,045,402, July 24, 1962, to Keely and Baisley. The height and width sensing means actuate control cylinder 26 whose rods 36 are connected to chains 38. Chains 38 are suitably coupled to the side rails 14 and to the applicators 28 and 30 in a manner well-known in the art so that the side rails are moved into contact with the case as shown in FIGURE 1 and the applicators are moved to the proper height above and below the case.

When the cast enters the machine, the bottom flaps are opened in a manner well-known in the art to permit the bottom of the case to be glue-sealed in the same manner as is used to seal the top. Suitable means are provided to support the product contained in the case until the bottom is folded closed and sealed.

Case 34 (FIGURES 1 and 2) is seen to comprise body 40, top leading flap 42, top trailing flap 44, top side flaps 46, bottom trailing flap 48 and bottom side flaps 50. The thermoplastic resin adhesive is applied to the leading and trailing flaps (top and bottom) in lines 52 and the wet glue is applied in lines 54. The thermoplastic resin adhesive is of the type which softens when heated and hardens very rapidly when cooled so that it serves to hold the folded down flaps in position until the wet glue sets.

In FIGURES 3 and 4 there is shown the means for adjusting the positions of switches 16 (1LS) and 20 (3LS) with respect to switch 18 (2LS). When a case is sensed by the height and width sensing means, the side rails 14, which had been moved to the widest spacing after the previous case was sealed, move toward each other in the direction of the arrows 56. At the same time, switches 16 and 20, which had been moved away from switch 18, move toward switch 18 in the direction of the arrows 58.

The movement of the switches is accomplished as follows: chains 60 and 62 are tied to the frame 64 as shown in FIGURE 3. Switch 16 is mounted on carriage 66 which is provided with four rollers 67 and block 68. Block 68 is affixed to chain 60 so that carriage 66 moves along side rail 14 in a longitudinal direction as the side rails are moved in and out. The rollers 67 facilitate this movement. Switch 20 is mounted on carriage 69 which is provided with rollers 70 and block 71 which is affixed to chain 62. The movement of carriage 69 is similar to that of carriage 66. The chains 60 and 62 are provided with direction changing gears 72 and 74 respectively, all of which are mounted on side rail 14 so as to move with it.

The means, shown in FIGURES 3A and 4, for adjusting the positions of switches 16 (1LS) and 20 (3LS) wtih respect to switches 18 (2LS) and 19 (4LS) is the same as that illustrated in FIGURES 3 and 4. Its mechanical operation is identical with that described above in connection with the first embodiment of the invention. Switch 19 should preferably be located opposite switch 18 but it may be displaced somewhat from the exactly opposite position shown in the figures.

In FIGURE 5, we have illustrated the schematic diagram of the electrical circuit of the first embodiment of the control system of the invention. Line 76 is connected directly to one side of the A-C supply. Line 78 is connected through a pair of contacts of the Start Relay (SR) to the same side of the A-C supply as line 76 and line 80 is connected to the second side of the A-C supply. Switch 81 serves as a "Run-Test" switch. As shown in the figure it is in the "Run" position. When the switch is closed to the "Test" position, the thermoplastic resin adhesive applicators and the wet glue applicators may be checked and tested.

The horizontal lines numbered 1 through 10 on FIGURE 5 are the various circuits used in connection with the control system of the invention. The symbol CR designates a control relay, the symbol LS designates a limit switch, and the symbol TDR designates a time delay relay. The circles designates relay coils and the parallel vertical lines designate a pair of relay contacts. If there is a diagonal line through the parallel vertical lines, the pair of contacts is normally closed and if there is none, the pair of contacts is normally open.

Toggle switches 82 and 84, when closed, respectively serve to connect the top and bottom thermoplastic resin adhesive applicators to the electrical circuit and toggle switches 86 and 88, when closed, respectively serve to connect the top and bottom wet glue applicators to the electrical circuit.

Operation proceeds as follows: case 34 enters the machine at the left of FIGURES 1 and 3 and its height and width are sensed by sensing means 12. Sensing means 12 causes cylinder 26 to move rods 36 and chains 38 so that the side rails 14 are moved into contact with the case (details not shown).

Case 34 now proceeds longitudinally through machine 10 and contacts limit switch 16 (1LS) which is normally closed (line 1, FIGURE 5) and which is pushed open by the case. This opens the circuit through a pair of contacts of control relay 2CR and the coil of control relay 1CR.

Now the case moves along and contacts limit switch 18 (2LS) and remains in contact with 1LS. This closes switch 2LS and the circuit through the coil of control relay 2CR (line 2). The pairs of contacts of control relay 2CR (lines 1, 3 and 4) are now closed. Since limit switch 20 (3LS) is normally closed and the case has not yet come in contact with it, the circuit on line 4 is closed thereby actuating control relay 3CR. Thus the pairs of contacts of control relay 3CR on lines 3 and 5 are closed. Now, since the circuit on line 3 is closed, current flows in the coil of time delay relay 1TDR which causes its contacts on line 5 to start to close. As soon as these contacts of time delay relay 1TDR on line 5 close, voltage is applied to applicators 28, whose respective toggle switches 82 and 84 have been closed, and thermoplastic resin adhesive is applied to the top leading flap and the bottom leading flap of case 34. If switch 82 is left open, no thermoplastic resin adhesive is applied to the top leading flap and if switch 84 is left open, none is applied to the bottom leading flap. At the same time, wet glue is applied to the top leading flap if switch 86 is closed and to the bottom leading flap if switch 88 is closed.

Now, the case moves on and comes in contact with limit switch 20 (3LS). This opens the circuit on line 4, thereby stopping the flow of current in the coil of control relay 3CR. This opens the contacts of control relay 3CR on line 3 thereby deactivating time delay relay 1TDR thus opening the circuit on lines 5–10 to stop the application of thermoplastic resin adhesive and wet glue.

The case proceeds and loses contact with switch 16 (1LS) while remaining in contact with switches 18 (2LS) and 20 (3LS). Switch 1LS closes thereby closing the circuit through the coil of control relay 1CR which closes the contacts of control relay 1CR (line 4). Thus, the circuit is closed to the coil of control relay 3CR and the application cycle for applying thermoplastic resin adhesive and wet glue to the appropriate trailing flaps takes place as described above for the leading flaps.

The case continues to move and loses contact with limit switch 2LS thereby opening the circuit to the coil of control relay 2CR and stopping the feed of thermoplastic resin adhesive and wet glue as described above. The case next contacts a switch (not shown) which moves the rails to their widest spacing and raises the top applicators to their highest position.

In FIGURE 5A, we have illustrated the schematic diagram of the electrical circuit of the alternative embodiment of the control system of the invention. Line 76 is connected directly to one side of the A-C supply. Line 78 is connected through a pair of contacts of the Start Relay to the same side of the A-C supply as line 76 and line 80 is connected to second side of the A-C supply. Switches 81, 82, 84, 86 and 88 serve the same purposes as the identical numbered switches shown in FIGURE 5.

Operation proceeds as follows: case 34 enters the machine at the left of FIGURES 1A and 3A and its height and width are sensed by sensing means 12. Sensing means 12 causes cylinder 26 to move rods 36 and chains 38 so that side rails 14 are moved into contact with the case.

Case 34 now proceeds longitudinally through machine 10 and contacts limit switch 16 (1LS) which is normally closed (top line, FIGURE 5A) and which is pushed open by the case. Now, both switches on the top line are open and one switch, namely switch 18 (2LS) on the second line is open. Therefore, there is no closed circuit from line 78 to line 80.

Now the case moves along and contacts limit switches 18 (2LS) and 19 (4LS) and remains in contact with 1LS. This closes switches 2LS and 4LS thereby closing the circuit from line 78 to line 80 through switches 2LS and 3LS. This actuates those applicators 28 and 30, whose control switches 82, 84, 86 and 88 are closed, so that thermoplastic resin adhesive and wet glue are applied to the top and/or bottom leading flaps of case 34. If any of the four control switches are open, the applicators connected therewith will not be actuated.

The case continues to move and contacts switch 20 (3LS). This opens the circuit on the second line and since the circuit on the first line is also open, the applicators are turned off, stopping the application of the thermoplastic resin adhesive and the wet glue. The case proceeds and loses contact with switch 16 (1LS) while remaining in contact with switches 18 (2LS), 19 (4LS) and 20 (3LS). Switch 1LS closes thereby closing the circuit on the first line and completing the circuit from line 78 to line 80 and the thermoplastic resin adhesive and wet glue are applied to the trailing flaps of the case.

The case continues to move and loses contact with switches 2LS and 4LS so that both control circuits are opened and the application of thermoplastic resin adhesive and wet glue stops as described above. The case next contacts a switch (not shown) which moves the rails to their widest spacing and raises the top applicators to their highest position.

While the invention has been disclosed in relation to specific examples and embodiments, we do not wish to be limited thereto, for obvious modifications, changes, alterations and adjustments will occur to those skilled in the art without departing from the spirit and scope of the invention. In the claims, we have referred to the top of the case, however it is within the contemplation of the invention to also use the control system for sealing only the bottom of the case. Therefore, where the word top is used alone in the claims, it is intended to mean either the top or the bottom.

What is claimed is:

1. A control system for a machine for glue-sealing product-containing cases wherein the cases are moved longitudinally through the machine and wherein the cases comprise a top leading flap, a top trailing flap and at least one top side flap which is in contact with the top leading flap and the top trailing flap when the case is closed and said machine includes a frame, first means for applying thermoplastic resin adhesive, second means for applying wet glue to the top leading flap and the top trailing flap and third means for controlling the actuation of the first means and the second means, comprising:

a first switch, a second switch, and a third switch placed longitudinally along the machine so as to be contacted serially by the passing cases and spaced such that all three switches may be in contact with a case at a specific time;

the first switch being normally closed and being opened when contacted by the case;

the second switch being normally open and being closed when contacted by the case;

the third switch being normally closed and being opened when contacted by the case;

electric circuit means connected to the first switch, the second switch and the third switch and to the means for controlling the actuation of the first means for applying thermoplastic resin adhesive and the second means for applying wet glue whereby:

thermoplastic resin adhesive and wet glue from the applicators selected by the third means are applied to the top leading flap when the case is simultaneously in contact with only the first switch and the second switch;

the flows of thermoplastic adhesive resin and wet glue are stopped when the case is simultaneously in contact with the first switch, the second switch and the third switch;

thermoplastic resin adhesive and wet glue from the applicators selected by the third means are applied to the top trailing flap when the case is simultaneously in contact with only the second switch and the third switch;

the flows of thermoplastic resin adhesive and wet glue are stopped when the case is in contact with only the third switch;

side rails mounted on said frame;

means for sensing the width and height of each case;

means responsive to said means for sensing the width and height of each case for moving the side rails away from and toward each other;

the first switch, the second switch and the third switch being mounted on at least one of the rails and including means operatively associated with said one side rail whereby in response to movement of said one rail, relative movement is imparted to said switches so that the longitudinal spacings between the first switch and the second switch and between the second switch and the third switch are varied in proportion with the spacing between the side rails.

2. A control system for a machine for glue-sealing product-containing cases as described in claim 1 wherein the cases comprise a bottom leading flap, a bottom trailing flap and at least one bottom side flap which is in contact with the bottom leading flap and the bottom trailing flap when the case is closed and said machine includes means for applying thermoplastic resin adhesive and means for applying wet glue to the bottom leading flap and the bottom trailing flap and wherein the control means acts such that thermoplastic resin adhesive and wet glue are applied to the bottom leading flap and the bottom trailing flap simultaneously with the application of thermoplastic resin adhesive and wet glue to the top leading flap and the top trailing flap, respectively.

3. A control system for a machine for glue-sealing product-containing cases as described in claim 2 wherein the means operatively associated with said one side rail comprises:

a pair of chain elements entrained along the length of said one rail and having their ends fixed to opposing sides of the machine frame;

said second switch being fixed at a generally mid portion of said one rail;

a pair of carriage means;

said first and third switches being mounted on separate ones of said carriage means; and said carriage means being mounted on separate ones of said chain elements, on the rail entrained portions thereof, and located on opposite sides of said second switch whereby said carriage means are adapted to ride along said one rail to effect said relative movement of the switches.

4. A control system for a machine for glue-sealing product-containing cases as described in claim 1 wherein the means operatively associated with said one side rail comprises:

a pair of chain elements entrained along the length of said one rail and having their ends fixed to opposing sides of the machine frame;

said second switch being fixed at a generally mid portion of said one rail;

a pair of carriage means;

said first and third switches being mounted on separate ones of said carriage means; and said carriage means being mounted on separate ones of said chain elements, on the rail entrained portions thereof, and located on opposite sides of said second switch whereby said carriage means are adapted to ride along said one rail to effect said relative movement of the switches.

5. In a machine for glue-sealing product-containing cases, a plurality of switch elements adapted to initiate machine operations and means to dispose said switches at a proper location with respect to dimensional characteristics of a case being treated, said means comprising:

means mounted on said frame for sensing the height and width of a case to be treated;

a pair of side rails mounted on said frame at least one of which is movable;

at least a first, a second and a third switch located serially along the longitudinal extent of said one movable rail;

said first switch being fixed to a generally mid-section of said one movable rail and said second and third switches being movable relative to said first switch and located on opposite sides of the first switch;

means responsive to said sensing means to impart movement to at least said one movable side rail whereby to properly position same in operative association with respect to said case to be treated; and means operatively associated with said one movable side rail whereby in response to the proper positioning of said one side rail, said second and third switches are simultaneously moved with and along said one rail, and relative to the first switch, to thereby effect said proper location of the switches.

6. In a machine for glue-sealing product-containing cases as described in claim 5 wherein said means to dispose said switches at a proper location with respect to dimensional characteristics of a case being treated, comprises:

a pair of chain elements entrained along the length of said one rail and having their ends fixed to opposing sides of the machine frame;

said second switch being fixed at a generally mid portion of said one rail;

a pair of carriage means;

said first and third switches being mounted on separate ones of said carriage means; and said carriage means being mounted on separate ones of said chain elements, on the rail entrained portions thereof, and located on opposite sides of said second switch whereby said carriage means are adapted to ride along said one rail to effect said relative movement of the switches.

7. A control system for a machine for glue-sealing product-containing cases wherein the cases are moved longitudinally through the machine and wherein the cases comprise a top leading flap, a top trailing flap and at least one top side flap which is in contact with the top leading flap and the top trailing flap when the case is closed and said machine includes a frame, first means for applying thermoplastic resin adhesive, second means for applying wet glue to the top leading flap and the top trailing flap and third means for controlling the actuation of the first means and the second means, comprising:

a pair of movable side rails mounted on opposite sides of, and along the longitudinal extent of, said frame;

first, second and third switches being mounted on, and disposed longitudinally along, one of said movable side rails so as to be contacted serially by the passing cases;

a fourth switch being mounted on and disposed along the other of said rails;

said first, second, third and fourth switches being located so that all four switches may be in contact with a case at a specific time;

the first switch being normally closed and being opened when contacted by a case at a specific time;

the second switch being normally open and being closed when contacted by the case;

the third switch being normally closed and being opened when contacted by the case;

the fourth switch being normally open and being closed when contacted by the case;

electric circuit means connected to each of the four switches and to the means for controlling the actuation of the first means for applying thermoplastic resin adhesive and the second means for applying wet glue whereby:

thermoplastic resin adhesive and wet glue from the applicators selected by the third means are applied to the top leading flap when the case is simultaneously in contact with only the first and second switches;

the flows of thermoplastic adhesive resin and wet glue are stopped when the case is simultaneously in contact with first, second, third and fourth switches;

thermoplastic adhesive resin and wet glue from the applicators selected by the third means are applied to the top trailing flap when the case is simultaneously in contact with only the second, third and fourth switches;

the flow of thermoplastic adhesive resin and wet glue are stopped when the case is in contact with only the third switch;

means for sensing the width and height of each case;

means responsive to said means for sensing the width and height of each case for moving the side rails away from and toward each other; and means operatively associated with said one of the movable side rails whereby in response to movement of said one rail, relative movement is imparted to said first, second and third switches so that the longitudinal spacings between the first switch and the second switch and between the second switch and the third switch are varied in proportion with the spacing between the side rails.

8. A control system for glue-sealing product-containing cases as in claim 7 wherein:

thermoplastic adhesive resin and wet glue from the applicators selected by the third means are applied to the top leading flap when the case is simultaneously in contact with only the first, second and fourth switches; and thermoplastic adhesive resin and wet glue from the applicators selected by the third means are applied to the top trailing flap when the case is simultaneously in contact with only the third and fourth switches.

9. A control system for a machine for glue-sealing product-containing cases as described in claim 8 wherein the means operatively associated with said one side rail comprises:

a pair of chain elements entrained along the length of said one rail and having their ends fixed to opposing sides of the machine frame;

said second switch being fixed at a generally mid portion of said one rail;

a pair of carriage means;

said first and third switches being mounted on separate ones of said carriage means; and said carriage means being mounted on separate ones of said chain elements, on the rail entrained portions thereof, and located on opposite sides of said second switch whereby said carriage means are adapted to ride along said one rail to effect said relative movement of the switches.

10. A control system for a machine for glue-sealing product-containing cases as described in claim 7 wherein the means operatively associated with said one side rail comprises:

a pair of chain elements entrained along the length of said one rail and having their ends fixed to opposing sides of the machine frame;

said second switch being fixed at a generally mid portion of said one rail;

a pair of carriage means;

said first and third switches being mounted on separate ones of said carriage means; and said carriage means being mounted on separate ones of said chain elements, on the rail entrained portions thereof, and located on opposite sides of said second switch whereby said carriage means are adapted to ride along said one rail to effect said relative movement of the switches.

(References on following page)

References Cited

UNITED STATES PATENTS

| | | | |
|---|---|---|---|
| 2,324,401 | 7/1943 | Kimball | 53—75 |
| 2,639,567 | 5/1953 | Murdoch et al. | 53—66 |
| 2,982,064 | 5/1961 | Hopkinson | 53—76 |
| 3,045,402 | 7/1962 | Keeley et al. | 53—66 |
| 3,052,072 | 9/1962 | Keeley et al. | 53—66 |
| 3,071,711 | 1/1963 | Hunter | 317—130 |
| 3,085,376 | 4/1963 | Ferguson et al. | 53—75 |
| 3,088,433 | 5/1963 | Walter et al. | 118—1 |
| 3,135,628 | 1/1964 | Johnson et al. | 118—3 |
| 3,154,726 | 10/1964 | McClain | 317—130 X |
| 3,183,639 | 5/1965 | Rodman | 53—75 |
| 3,255,037 | 6/1966 | Knight et al. | 118—8 X |
| 3,267,640 | 8/1966 | Romney et al. | 53—75 |

MORRIS KAPLAN, *Primary Examiner.*